United States Patent
Dharmadhikari et al.

(10) Patent No.: US 12,441,449 B1
(45) Date of Patent: Oct. 14, 2025

(54) THERMAL MANAGEMENT SYSTEMS AND METHODS FOR THERMALLY MANAGING COMPONENTS FOR MARINE VESSELS

(71) Applicant: Brunswick Corporation, Mettawa, IL (US)

(72) Inventors: Chetan Dharmadhikari, North Fond du Lac, WI (US); John Oenick, Madison, WI (US); John Ledden, Edgewater, FL (US); Grant Shane, Bettendorf, IA (US); Clint Szumal, Bruce Township, MI (US)

(73) Assignee: Brunswick Corporation, Mettawa, IL (US)

( * ) Notice: Subject to any disclaimer, the term of this patent is extended or adjusted under 35 U.S.C. 154(b) by 546 days.

(21) Appl. No.: 17/900,470

(22) Filed: Aug. 31, 2022

(51) Int. Cl.
*B63H 20/00* (2006.01)
*B60L 58/26* (2019.01)
(Continued)

(52) U.S. Cl.
CPC ............ *B63H 20/001* (2013.01); *B60L 58/26* (2019.02); *B63H 20/28* (2013.01); *F28D 1/022* (2013.01);
(Continued)

(58) Field of Classification Search
CPC ....... F01P 7/165; B63H 20/001; B63H 20/28; B60L 58/26; F28D 1/022; F28F 27/02;
(Continued)

(56) References Cited

U.S. PATENT DOCUMENTS

| | | | |
|---|---|---|---|
| 3,721,104 | A | 3/1973 | Adler |
| 4,226,606 | A | 10/1980 | Yaeger et al. |

(Continued)

FOREIGN PATENT DOCUMENTS

| | | |
|---|---|---|
| CN | 102407931 B | 11/2013 |
| CN | 205930240 U | 2/2017 |

(Continued)

OTHER PUBLICATIONS

Search Report in corresponding Application No. GB2405641.8, dated Sep. 16, 2024, 5 pages.

(Continued)

*Primary Examiner* — Andrew Polay
(74) *Attorney, Agent, or Firm* — Andrus Intellectual Property Law, LLP

(57) ABSTRACT

A thermal management system for a marine vessel. The thermal management system includes an open loop circuit and a pump that pumps water from a body of water, through the open loop circuit, and back to the body of water. The thermal management system further includes a closed loop circuit and a pump that pumps a heat transfer fluid through the closed loop circuit. A heat exchanger is configured to exchange heat between the water and the heat transfer fluid. The thermal management system includes multiple components each cooled or heated by the heat transfer fluid. A valve has valve positions configured to vary a sequence that the heat transfer fluid is conveyed to the components so as to vary how the components share the heating and cooling from the heat transfer fluid and from the water from the body of water via the heat transfer fluid.

19 Claims, 7 Drawing Sheets

(51) Int. Cl.

| | | |
|---|---|---|
| *B63H 20/28* | (2006.01) | |
| *F28D 1/02* | (2006.01) | |
| *F28F 27/02* | (2006.01) | |
| *H01M 10/46* | (2006.01) | |
| *H01M 10/613* | (2014.01) | |
| *H01M 10/615* | (2014.01) | |
| *H01M 10/625* | (2014.01) | |
| *H01M 10/6568* | (2014.01) | |

(52) U.S. Cl.
CPC ............. *F28F 27/02* (2013.01); *H01M 10/46* (2013.01); *H01M 10/613* (2015.04); *H01M 10/615* (2015.04); *H01M 10/625* (2015.04); *H01M 10/6568* (2015.04); *H01M 2220/20* (2013.01)

(58) Field of Classification Search
CPC .. H01M 10/46; H01M 10/613; H01M 10/615; H01M 10/625; H01M 10/6568; H01M 2220/20
See application file for complete search history.

(56) References Cited

U.S. PATENT DOCUMENTS

| | | | |
|---|---|---|---|
| 4,617,472 A | 10/1986 | Slavik | |
| 5,004,042 A | 4/1991 | McMorries et al. | |
| 5,599,217 A | 2/1997 | Ferrante | |
| 5,746,270 A | 5/1998 | Schroeder et al. | |
| 5,848,536 A | 12/1998 | Dodge | |
| 6,273,771 B1 | 8/2001 | Buckley et al. | |
| 6,525,431 B1 | 2/2003 | Clucas | |
| 7,066,777 B2 | 6/2006 | Maseltee | |
| 7,089,955 B1 | 8/2006 | Komro, Sr. | |
| 7,094,118 B1 | 8/2006 | Phillips et al. | |
| 7,114,469 B1 | 10/2006 | Taylor | |
| 7,150,664 B1 | 12/2006 | Uppgard et al. | |
| 7,156,709 B1 | 1/2007 | Staerzl et al. | |
| 7,172,831 B2 | 2/2007 | Kumar et al. | |
| 7,255,616 B1 | 8/2007 | Caldwell | |
| 7,264,520 B1 | 9/2007 | Taylor et al. | |
| 7,284,710 B2 | 10/2007 | Rixen | |
| 7,416,456 B1 | 8/2008 | Gonring et al. | |
| 7,467,595 B1 | 12/2008 | Lanyi et al. | |
| 7,503,819 B1 | 3/2009 | Jaeger et al. | |
| 7,569,954 B2 | 8/2009 | Tölle et al. | |
| 7,789,176 B2 | 9/2010 | Zhou | |
| 7,975,637 B1 | 7/2011 | Nida | |
| 8,011,982 B1 | 9/2011 | Baier et al. | |
| 8,043,132 B1 | 10/2011 | Wyant | |
| 8,137,146 B2* | 3/2012 | Cohen | F01P 7/16 440/88 HE |
| 8,298,025 B2 | 10/2012 | Eichinger | |
| 8,336,319 B2 | 12/2012 | Johnston et al. | |
| 8,403,234 B2 | 3/2013 | Wolter | |
| 8,500,501 B1 | 8/2013 | Taylor | |
| 8,535,104 B1 | 9/2013 | Nida | |
| 8,763,566 B1 | 7/2014 | Taylor et al. | |
| 8,864,538 B1* | 10/2014 | Arbuckle | B63H 21/383 440/88 P |
| 8,944,865 B1 | 2/2015 | Krabacher et al. | |
| 9,234,450 B2 | 1/2016 | England et al. | |
| 9,248,898 B1 | 2/2016 | Kirchhoff et al. | |
| 9,359,057 B1 | 6/2016 | Andrasko et al. | |
| 9,403,588 B1 | 8/2016 | George et al. | |
| 9,446,828 B1 | 9/2016 | Groeschel et al. | |
| 9,446,830 B2 | 9/2016 | Hartmeyer et al. | |
| 9,505,307 B2 | 11/2016 | Champagne et al. | |
| 9,680,190 B1 | 6/2017 | Xia | |
| 9,758,010 B2 | 9/2017 | Johnston | |
| 9,802,459 B2* | 10/2017 | Kamps | F24D 15/02 |
| 9,802,687 B2 | 10/2017 | Davis et al. | |
| 9,815,539 B1 | 11/2017 | Provost | |
| 9,975,619 B1 | 5/2018 | Gonring | |
| 9,994,296 B1 | 6/2018 | Balogh et al. | |
| 10,047,661 B1 | 8/2018 | Torgerud | |
| 10,151,539 B2 | 12/2018 | Kamps et al. | |
| 10,184,684 B2 | 1/2019 | Kurelowech | |
| 10,336,429 B1 | 7/2019 | Amerling et al. | |
| 10,366,429 B2 | 7/2019 | Amerling et al. | |
| 10,378,423 B1 | 8/2019 | Reichardt et al. | |
| 10,408,548 B2 | 9/2019 | Bell et al. | |
| 10,495,025 B2 | 12/2019 | Bell et al. | |
| 10,594,510 B1 | 3/2020 | Arbuckle et al. | |
| 10,889,205 B2 | 1/2021 | Hettrich | |
| 10,890,098 B1 | 1/2021 | Kurzynski et al. | |
| 10,967,702 B2 | 4/2021 | Mancini | |
| 11,072,408 B1 | 7/2021 | Kurzynski et al. | |
| 11,214,114 B2 | 1/2022 | Smith | |
| 11,286,027 B1 | 3/2022 | Dharmadhikari et al. | |
| 11,293,335 B1 | 4/2022 | Radavich et al. | |
| 11,352,937 B1 | 6/2022 | Dreyer et al. | |
| 11,358,434 B2 | 6/2022 | Porras | |
| 2002/0079376 A1 | 6/2002 | R Enander | |
| 2003/0226904 A1 | 12/2003 | Haklander | |
| 2006/0130888 A1 | 6/2006 | Yamaguchi et al. | |
| 2007/0147809 A1 | 6/2007 | Rixen | |
| 2010/0279153 A1 | 11/2010 | Payne | |
| 2012/0152186 A1* | 6/2012 | Sujan | F01P 3/20 123/41.31 |
| 2012/0180997 A1 | 7/2012 | Johnston | |
| 2016/0059949 A1 | 3/2016 | Rebele et al. | |
| 2016/0107505 A1 | 4/2016 | Johnston | |
| 2018/0178615 A1 | 6/2018 | Xia | |
| 2018/0354339 A1 | 12/2018 | Smith et al. | |
| 2018/0372334 A1 | 12/2018 | Walker | |
| 2019/0176572 A1 | 6/2019 | Kim | |
| 2019/0383563 A1 | 12/2019 | He et al. | |
| 2020/0255112 A1 | 8/2020 | Doremus et al. | |
| 2020/0370463 A1 | 11/2020 | Saruwatari | |
| 2021/0197692 A1 | 7/2021 | Hettrich | |
| 2022/0097484 A1 | 3/2022 | Rixens | |
| 2022/0111700 A1 | 4/2022 | Henderson | |
| 2022/0115719 A1 | 4/2022 | King | |
| 2023/0242230 A1 | 8/2023 | Nakagawa | |

FOREIGN PATENT DOCUMENTS

| | | |
|---|---|---|
| CN | 108482064 A | 9/2018 |
| CN | 209441180 U | 9/2019 |
| CN | 110588277 A | 12/2019 |
| CN | 112678139 A | 4/2021 |
| CN | 112682157 | 4/2021 |
| CN | 213743657 U | 7/2021 |
| CN | 114523816 A | 5/2022 |
| DE | 102009056027 | 1/2014 |
| DE | 102021131215 A1 | 6/2022 |
| EP | 2044370 | 4/2009 |
| EP | 2907739 A1 | 8/2015 |
| EP | 3454401 | 5/2021 |
| GB | 2388184 A | 11/2003 |
| JP | 2006103537 A | 4/2006 |
| JP | 2014239607 A | 12/2014 |
| KR | 20210015197 A | 2/2021 |
| KR | 102542738 B1 | 6/2023 |
| WO | 2010102606 | 9/2010 |
| WO | 2011005775 | 1/2011 |
| WO | 2013029808 | 3/2013 |
| WO | 2013124610 A2 | 8/2013 |
| WO | 2021055758 A1 | 3/2021 |

OTHER PUBLICATIONS

Whale RV Catalog, pp. 8-9, https://www.delzer.com/navico/whale-rv-catalog/8/, accessed Apr. 11, 2023.

Dharmadhikari et al., "Marine Drives And Marine Vessels Having Cooling Systems", U.S. Appl. No. 17/978,758, filed Nov. 1, 2022 (drawings, specification, and claims only).

Dharmadhikari et al., "Thermal Management Systems For Marine Vessels", U.S. Appl. No. 17/988,104, filed Nov. 16, 2022 (drawings, specification, and claims only).

(56) References Cited

OTHER PUBLICATIONS

Kelly, "Thermal Management Systems For Marine Vessels", U.S. Appl. No. 17/977,570, filed Oct. 31, 2022 (drawings, specification, and claims only).

Denso, Heat Pump Air-Conditioning System, https://www.denso.com/global/en/business/products-and-services/mobility/pick-up/hpacs/, accessed Apr. 13, 2023.

Naik et al., "Marine Propulsion System And Method For Wake Control", U.S. Appl. No. 17/903,938, filed Sep. 6, 2022 (drawings, specification, and claims only).

Kuuma 11 Gallon Marine Water-Heater 120V Front Heat Exchanger Front/Bak Mount, Camco Marine, https://www.camcomarine.com/products/11-gal-water-heater-120v-front-heat-exch-fr-back-mount, accessed 1Nov. 10, 2023.

Witte, "Cooling System For A Marine Vessel", U.S. Appl. No. 18/053,513, filed Nov. 8, 2022 (drawings, specification, and claims only).

Search Report in corresponding Application No. EP24171732.1, dated Oct. 9, 2024, 8 pages.

\* cited by examiner

THERMAL MANAGEMENT SYSTEMS AND METHODS FOR THERMALLY MANAGING COMPONENTS FOR MARINE VESSELS

FIELD

The present disclosure generally relates to thermal management systems and methods for thermally managing components for marine vessels.

BACKGROUND

The following U.S. Patents provide background information and are incorporated by reference in entirety.

U.S. Pat. No. 7,975,637 discloses a method and apparatus for controlling the temperature of batteries in a hybrid marine vessel utilizing a compartment to store the batteries and various conduits to conduct air to and from that compartment. A heat exchanger can draw air from the compartment and cool the air for use in the cabin of the marine vessel. The air from the cabin can be directed into the compartment to provide a flow of air that carries heat away from the batteries in the compartment and toward the heat exchanger.

U.S. Pat. No. 8,864,538 discloses systems and methods for cooling a marine propulsion system on a marine vessel. A lift pump pumps raw cooling water from a body of water in which the marine vessel is situated. The lift pump pumps the raw cooling water through an open cooling circuit from an upstream inlet for receiving the raw cooling water to a downstream outlet for discharging the cooling water back to the body of water. A control circuit controls operation of the lift pump. At least one sensing device indicates whether the lift pump is connected to the body of water. The sensing device is in communication with the control circuit. The control circuit prevents operation of the lift pump when the sensing device indicates that the lift pump is not connected to the body of water.

U.S. Pat. No. 9,403,588 discloses systems for cooling a marine engine operated in a body of water. The systems can include an open loop cooling circuit for cooling the marine engine. The open loop cooling circuit is configured to convey cooling water from the body of water to the marine engine so that heat is exchanged between the cooling water and the marine engine. A pump is configured to pump the cooling water from upstream to downstream through the open loop cooling circuit. A heat exchanger is configured to cause an exchange of heat between the cooling water located upstream of the marine engine and the cooling water located downstream of the marine engine to thereby warm the cooling water located upstream of the marine engine, prior to cooling the marine engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a thermal management system for a marine vessel. The thermal management system includes an open loop circuit and a pump that pumps water from a body of water, through the open loop circuit, and back to the body of water. The thermal management system further includes a closed loop circuit and a pump that pumps a heat transfer fluid through the closed loop circuit. A heat exchanger is configured to exchange heat between the water and the heat transfer fluid. The thermal management system includes multiple components each cooled or heated by the heat transfer fluid. A valve has valve positions configured to vary a sequence that the heat transfer fluid is conveyed to the components so as to vary how the components share the heating and cooling from the heat transfer fluid and from the water from the body of water via the heat transfer fluid.

Another embodiment of the present disclosure generally relates to another thermal management system for a marine vessel. The thermal management system includes a first open loop circuit and a pump that pumps water from the body of water in which the marine vessel is operating, through the first open loop circuit, and back to the body of water. The thermal management system further includes a first closed loop circuit and a pump that pumps a first heat transfer fluid through the first closed loop circuit. A first heat exchanger is configured to exchange heat between the water and the first heat transfer fluid. Each component in a first set of components is cooled or heated by the first heat transfer fluid. A first valve has valve positions configured to vary a sequence that the first heat transfer fluid is conveyed to the first set of components so as to vary how the first set of components share the heating and cooling from the first heat transfer fluid and from the water from the body of water via the first heat transfer fluid. The thermal management system further includes a second closed loop circuit and a pump that pumps a second heat transfer fluid through the second closed loop circuit. A second heat exchanger is configured to exchange heat between the first heat transfer fluid and the second heat transfer fluid. Each component in a second set of components is each cooled or heated by the second heat transfer fluid. The thermal management system further includes a third closed loop circuit and a pump that pumps a third heat transfer fluid through the third closed loop circuit. Each component in a third set of components is cooled by the third heat transfer fluid. A second valve has a first valve position and a second valve position, where in the first position the second valve fluidly separates the second closed loop circuit and the third closed loops from each other, and where in the second position the second valve fluidly couples the second closed loop circuit and the third closed loop circuit in series such that the second heat transfer fluid and the third heat transfer fluid are each conveyed to both the second set of components and the third set of components.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

The present disclosure generally relates to thermal management systems for marine vessels. As discussed further below, these thermal management systems are operable to vary a sequence in which heat transfer fluid is conveyed between components to be heated or cooled by the heat transfer fluid. Varying this sequence in turn varies how these components share the heating and cooling from the heat transfer fluid and from a body of water in which a marine vessel is operated. It should be recognized that the heat transfer fluids disclosed herein may be liquids, gases, or a combination of both.

Figure 1:
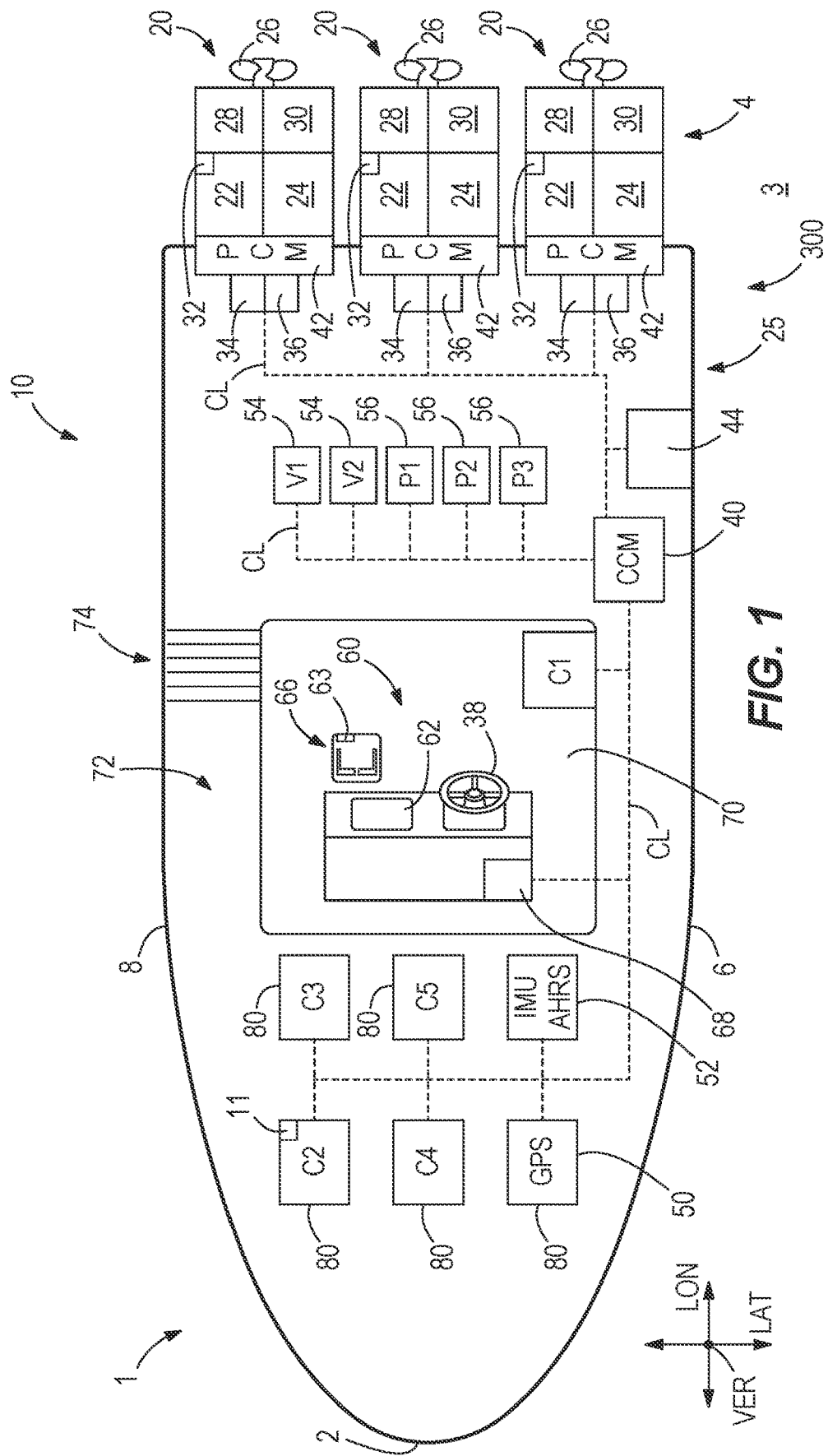
FIG. 1 is a top view of a marine vessel incorporating a thermal management system according to the present disclosure.

FIG. 1 shows a thermal management system 10 for a marine vessel 1 according to the present disclosure. The marine vessel 1 extends between a bow 2 and a stern 4 along a longitudinal axis LON and between a port side 6 and starboard side 8 along a latitudinal axis LAT perpendicular to the longitudinal direction LON (each also being perpendicular to the vertical axis VER). The marine vessel 1 is propelled through a body of water 3 by marine propulsion devices 20, which while shown as outboard motors could also be inboard motors, stern drives, pod drives, and/or jet drives. Each marine propulsion device 20 includes a powerhead 22. The powerheads 22 may be internal combustion engines (e.g., gasoline or diesel engines), electric motors, and/or hybrids thereof. A propeller 26 is coupled in torque-transmitting relationship with each powerhead 22 to generate propulsion in the water. The rotational engagement between the powerhead 22 and the propeller 26 is provided through a multi-speed transmission 28 and gearset 30 in a manner known in the art. The marine propulsion devices 20 further include powerhead speed sensors 32 that measure a speed of the respective powerheads 22 in a manner known in the art.

Steering actuators 34 are operable to steer the marine propulsion device 20 in accordance with commands from a steering input device such as a steering wheel 38. The steering actuators 34 may be hydraulically, pneumatically, and/or electromechanically operated such as those discussed in U.S. Pat. Nos. 7,150,664; 7,255,616; and 7,467,595, which are incorporated by reference herein. Similarly, trim actuators 36 are operable to adjust a trim angle for each of the marine propulsion devices 20 in a manner known in the art. The trim actuators 30 may be hydraulically, pneumatically, and/or electromechanically operated such as those discussed in U.S. Pat. Nos. 6,583,728; 7,156,709; 7,416, 456; and 9,359,057, which are incorporated by reference herein.

With continued reference to FIG. 1, a central control module 40 (or CCM) is provided in signal communication with propulsion control devices 42 of the marine propulsion devices 20, as well as with other devices discussed herein. Although FIG. 1 shows one central control module 40, the present disclosure contemplates configurations in which multiple central control modules work together, serially and/or in parallel (e.g., providing a central control module for each marine propulsion devices 20). Likewise, it should be recognized that the lines CL shown to represent both communication and power connections are merely examples.

A power system 25 provides electric power various devices within the marine vessel 1, including the powerheads 22 in the case of electric or hybrid powerheads. By way of example, the power system 25 may include batteries and/or other power storage devices, chargers, inverters (e.g., DC-AC inverters, AC-DC inverters), converters (e.g., DC-DC converters), and power distribution systems. The devices within the power system 25 may be provided as local power systems 24 positioned with the marine propulsion devices 20, a central power system 44 positioned in the marine vessel 1, or a combination thereof.

Another device powered by the power system 25 is a global positioning system (GPS) 50 that provides location and speed of the marine vessel 1 to the central control module 40. The power system 25 also powers an inertial measurement unit (IMU) or an attitude and heading reference system (AHRS) (collectively shown as the IMU/AHRS 52). An IMU has a solid state, rate gyro electronic compass that indicates the vessel heading and solid-state accelerometers and angular rate sensors that sense the vessel's attitude and rate of turn. Further devices powered by the power system 25 include valves 54 and pumps 56 within the thermal management system 10, which provide heating and cooling for devices as discussed below.

With continued reference to FIG. 1, the marine vessel 1 includes a helm 60 having a number of operator input devices for controlling various functions of the thermal management system 10 and the marine vessel 1 more generally. The operator input devices at the helm 60 include a multi-functional display device 62 including a user interface, such as an interactive, touch-capable display screen, a keypad, a display screen and keypad combination, and/or any other interfaces known in the art. By way of example, the display device 62 may be part of a VesselView® onboard management system by Mercury Marine Corporation of Fond du Lac, Wisconsin. The operator input devices further include one or more steering devices, such as the steering wheel 38 and/or a joystick, configured to facilitate user input for steering the marine vessel 1 (e.g., via the central control module 40, the propulsion control modules 42, and/or a helm controller 68 in a manner known in the art). A throttle lever 66 is also provided as an operator input device for providing thrust commands to the central control module 40. Additional information relating to input devices and related control is provided in U.S. Pat. Nos. 9,248,898; 9,975,619; 9,994,296; and 10,594,510; which are incorporated by reference herein.

The helm 60 of the marine vessel 1 is positioned in a cockpit 70, which in FIG. 1 is positioned above a cabin 72 and accessible via stairs 74. Various devices are positioned within the cockpit 70 and within the cabin 72 that require heating and/or cooling depending on usage, which may also be referenced as components 80. Some of the components 80 of FIG. 1 are separately identified as components C1-C5 for further discussion. Component C1 is an HVAC system for the cockpit 70, which requires heating when controlled to heat the cockpit 70 and cooling when controlled to cool the cockpit 70. Components C2-C5 are used in conjunction with the cabin 72. Component C2 is an HVAC system for the cabin 72 that, like the HVAC system for the cockpit 70, requires heating when controlled to heat the cabin 72 and cooling when controlled to cool the cabin 72. Component C3 is a refrigerator and thus only requires cooling (also referred to as being a heat "source"). Component C4 is a freezer and thus, like component C3, requires only cooling. Component C5 is a water heater, thereby requiring only heating (also referred to as being a heat "sink"). The components 80 to be heated or cooled by the thermal management system 10 may include other heat sources, heat sinks, or combinations thereof associated with the marine propulsion devices 20 or marine vessel 1. By way of example, these other components 80 may include powerheads 22, multi-speed transmissions 28, or portions of the power system 25.

Figure 2:
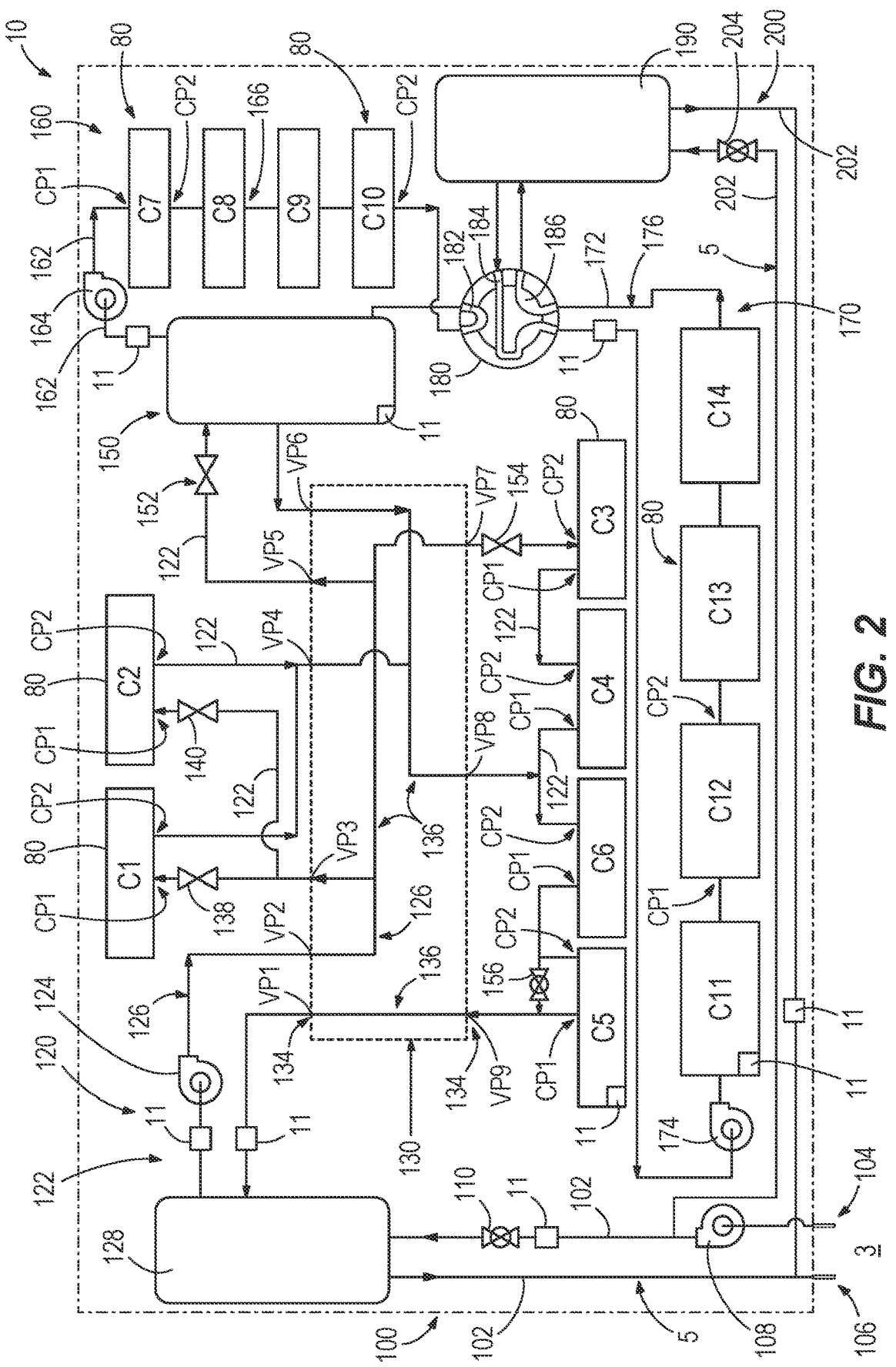
FIG. 2 is schematic view of a thermal management system according to the present disclosure conveying a heat transfer fluid to components in a first sequence.

FIG. 2 shows a thermal management system 10 for sharing heating and cooling across the components 80 of a marine vessel according to the present disclosure. The thermal management system 10 includes a first open loop circuit 100 that extends via conduits 102 between an inlet 104 and an outlet 106. The inlet 104 is positioned so as to draw in water 5 from the body of water 3 in which the marine vessel is operated. The outlet 106 is positioned to return the water from the first open loop circuit 100 back to the body of water 3. A pump 108 is fluidly connected within the first open loop circuit 100 and pumps the water from the body of water 3 into the inlet 104, through the first open loop circuit 100, and back to the body of water 3 via the outlet 106. A valve 110 is provided within the first open loop circuit 100 and is positionable to select whether between the water is pumped via the pump 108 to the first heat exchanger 128.

By way of example, the conduits 102 may be combinations of hoses, pipes, through-holes, and passages through components (such as a heat exchanger as discussed below). The inlet 104 and/or the outlet 106 may be formed in a gearcase of a marine propulsion device 20 or provided as through-hole in a hull of the marine vessel in a conventional manner.

The thermal management system 10 further includes a first closed loop circuit 120 formed by conduits 122. A pump 124 is fluidly connected within the first closed loop circuit 120 and pumps a heat transfer fluid 126 therethrough. The heat transfer fluid 126 may also be water or may be another liquid such as a refrigerant used in air conditioning systems, a water-ethylene-glycol (WEG) mixture, or oil. The conduits 122 may be similar to the conduits 102 of the first open loop circuit 100.

With continue reference to FIG. 2, the first open loop circuit 100 and the first closed loop circuit 120 each extend through a first heat exchanger 128. The first heat exchanger 128 is configured to exchange heat between the water in the first open loop circuit 100 and the heat transfer fluid in the first closed loop circuit 120. It should be recognized that, via the first heat exchanger 128, the water in the first open loop circuit 100 heats the heat transfer fluid 126 when the warmer than the heat transfer fluid 126, and conversely cools the heat transfer fluid 126 when cooler than the heat transfer fluid 126. Additional information regarding heat exchangers and cooling circuits is provided in U.S. Pat. Nos. 5,004,042; 5,746,270; 6,748,906; and 7,094,118, which are incorporated by reference in their entireties.

The heat transfer fluid 126 is circulated through the first closed loop circuit 120 to heat and cool a series of components 80 as needed. The components 80 discussed herein may include cold plates, water jackets or other manifolds in a manner known in the art that provide heat exchange between the component 80 and the heat transfer fluid 126 flowing therethrough. In addition to facilitating heat transfer, the use of cold plates, water jackets, manifolds, and/or the like also isolate and protect other portions of the component from exposure to the heat transfer fluid 126 (e.g., electronics, oil passages or reservoirs, exhaust passages). Similar to the discussion above with respect to the heat exchanger 128, a given component 80 is cooled when the heat transfer fluid 126 provided thereto is cooler and is warmed when the heat transfer fluid 126 is warmer. For simplicity, the present disclosure refers to providing the heat transfer fluid to the components or the heat transfer fluid flowing through the components irrespective of how heat is exchanged between the components and the heat transfer fluid. Likewise, it should be recognized that the components 80 discussed herein may be positioned within the marine propulsion devices 20, the marine vessel 1, or a combination of both.

A valve 130 is provided within the first closed loop circuit 120 and fluidly connects the first heat exchanger 128 and the components 80. The valve 130 has a body 132 with a series of valve ports 134 on the exterior of the body 132. The valve 130 of FIG. 2 specifically has nine valve ports 134, which for ease of reference are also labeled as valve ports VP1-VP9. The valve ports 134 may include quick-connect connectors, such as John Guest type connectors, for easily connecting the valve 130 to other components within the first closed loop circuit 120 via corresponding conduits as the conduits 122. The valve 130 is positionable in different valve positions that change which of the valve ports 134 are fluidly connected within the body 132. By way of example, the valve 130 may be a spool valve in which the different valve positions correspond to different positions of a spool within the body 132, which vary the pathways 136 between the valve ports 134 inside the valve 130. Electronically controlled fluid or gas valves are widely available in the market, for example produced by Humphrey, Parker, Enfield, US Solid, Eaton, Hfs, Talonz, and others. These devices provide feedback via digital or analog signals communicated via CAN, RS232, or other protocols and form factors presently known in the art. Additional details regarding the valve positions and the corresponding pathways 136 between the valve ports 134 are provided below.

With continued reference to FIG. 2, the valve 130 is fluidly connected to the components 80 within the first closed loop circuit 120, specifically via conduits 122 connected to a first component port CP1 and/or a second component port CP2 of these components 80. The components 80 include, among others, the components C1-C5 shown in FIG. 1. As is discussed further below, changing the valve position of the valve 130 varies the sequence in which the heat transfer fluid 126 flows to the components 80, thereby varying how the components 80 share the heating and cooling from the heat transfer fluid 126 and the water 5 from the body of water 3 via the heat transfer fluid 126.

The particular fluid connections of the conduits 122 amongst the components 80 and between the components 80 and the valve 130 are now described. A first valve port VP1 and a second valve port VP2 of the valve are each connected to the first heat exchanger 128. As will be discussed further below, the first valve port VP1 is a valve outlet from the valve 130 to the first heat exchanger 128 and the second valve port VP2 as a valve inlet from the first heat exchanger 128 into the valve 130. A third valve port VP3 is connected to the first component ports CP1 of both the first component C1 and the second component C2, here in parallel to each other. Valves 138, 140 are provided between the valve 130 and the first component C1 and between the valve 130 and the second component C2, respectively, to control the flow through the third valve port VP3. A fourth valve port VP4 is connected to the second component ports CP2 of both the first component C1 and the second component C2, also in parallel. Fifth and sixth valve ports VP5, VP6 are connected to a second heat exchanger 150, which as discussed further below provide flow of the heat transfer fluid 126 to and from the second heat exchanger 150 similar to the first heat exchanger 128 discussed above. A valve 152 is provided between the valve 130 and the second heat exchanger 150 to control a flow through the fifth valve port VP5.

With continued reference to FIG. 2, the seventh valve port VP7 is connected to the second component port CP2 of the third component C3, here with a valve 154 therebetween. The first component port CP1 of the third component C3 is connected via a conduit 122, outside the valve 130, to the second component port CP2 of the fourth component C4. The first component port CP1 of the fourth component C4 is connected to both the eighth valve port VP8 and (outside the valve 130) to the second component port CP2 of a sixth component C6, here a compressor. By way of example, the compressor may be an electronic scroll compressor presently available in the market from Bosch, Denso, Berquist, or other producers. The second component port CP2 of the sixth component C6 is also connected to the eighth valve port VP8. The first component port CP1 of the sixth component C6 is connected to both the second component port CP2 of the fifth component C5 and to the ninth valve port VP9 of the valve 130 (through another valve 156), both outside the valve 130. The first component port CP1 of the fifth component C5 is also connected to the ninth valve port VP9.

The thermal management system 10 of FIG. 2 further includes a second closed loop circuit 160 formed by conduits 162. A pump 164 is fluidly connected within the second closed loop circuit 160 and pumps another heat transfer fluid 166 through the second closed loop circuit 160. The heat transfer fluid 166 may be water, a liquid chemically the same as the heat transfer fluid 126 discussed above, or another liquid such as a refrigerant used in air conditioning systems or a water-ethylene-glycol (WEG) mix. The conduits 162 may be similar to the conduits 102 or the conduits 122 discussed above.

The second closed loop circuit 160 extends through the second heat exchanger 150. As discussed above, the first closed loop circuit 120 also extends through the second heat exchanger 150. The second heat exchanger 150 is configured such that heat is exchanged between the respective heat transfer fluids 126, 166 of the first and second closed loop circuits 120, 160. The heat transfer fluid 166 is circulated through the second closed loop circuit 160 to heat and cool a set of components 80 as needed, shown here as components C7-C10. By way of example, the seventh component C7 may be a heater, the eighth component C8 may be a battery, the ninth component C9 may be a battery charger, and the tenth component C10 may be a DC-DC converter. Each of the components C7-C10 are connected via first and second component ports CP1, CP2 as shown and described above. Some of the components 80 in the second closed loop circuit 160, as within other circuits, may coincide with components discussed above and shown in FIG. 1. By way of example, and with reference to FIG. 1, components C8-C10 may be part of the power local power systems 24 integrated with the marine propulsion devices 20, the central power system 44 positioned in the marine vessel 1, or a combination thereof. It should be recognized that each element may represent multiple elements in practice. For example, the battery C8 may be one or more batteries connected in series and/or in parallel.

With continued reference to FIG. 2, the second closed loop circuit 160 is configured such that the heat transfer fluid 166 flows therethrough in a fixed direction (here, clockwise). In view of this, the components C7-C10 are in some cases connected in series in accordance with the heat tolerance of each component individually. In other words, components with lower optimal or required operating temperatures are connected upstream of others having relatively higher optimal or required operating temperatures (e.g., a battery being upstream of a battery charger). In other cases, such as the heater (component C7) is provided upstream of the battery (component C8) it is intended to heat. The heat transfer fluid 166 returns to the heat exchanger 150 after flowing through the components C7-C10 to again exchange heat with the heat transfer fluid 126 in the first closed loop circuit 120.

Figure 3:
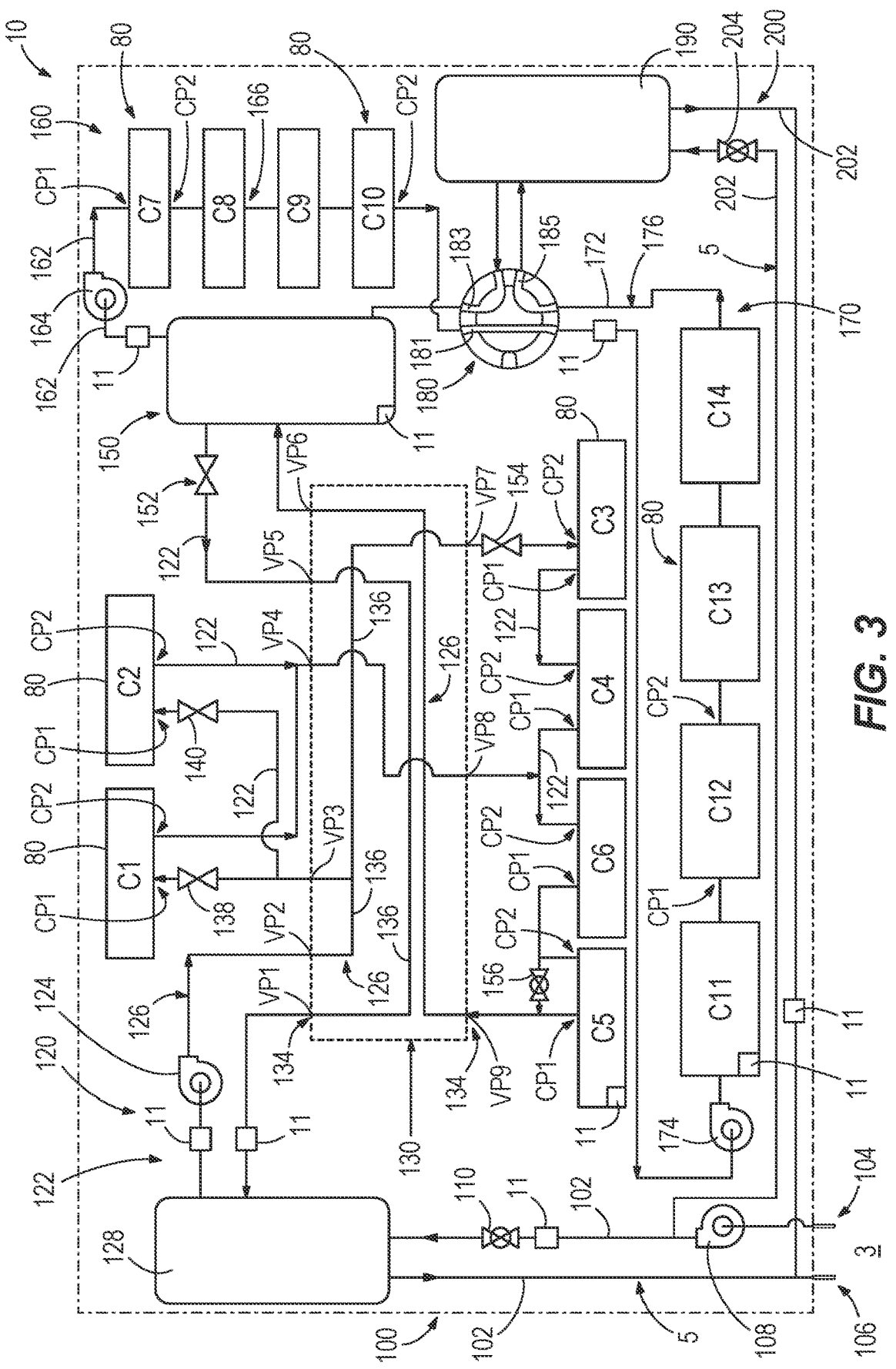
FIG. 3 is schematic view of the thermal management system of FIG. 2 conveying the heat transfer fluid to the components in a second sequence.

The thermal management system 10 of FIG. 2 further includes a third closed loop circuit 170 formed by conduits 172. A pump 164 is fluidly connected within the third closed loop circuit 170 and pumps another heat transfer fluid 176 therethrough. As will become apparent, the heat transfer fluid 176 is chemically the same as the heat transfer fluid 166. In particular, the second closed loop circuit 160 and the third closed loop circuit 170 are selectively fluidly connected together by control of a valve 180. The valve 180 has pathways 182, 184, 186 that change a flow of the heat transfer fluid 166 and the heat transfer fluid 176 therethrough. In a first valve position (FIG. 2), the valve 180 is closed so as to fluidly separate the second closed loop circuit 160 and the third closed loop circuit 170. In contrast, the second closed loop circuit 160 and the third closed loop circuit 170 are connected in series when the valve 180 is in the open position (FIG. 3).

As shown in FIG. 2, the heat transfer fluid 176 is circulated through the third closed loop circuit 170 to heat and cool a set of components 80 as needed, shown here as components C11-C14. Each of the components C11-C14 are connected via first and second component ports CP1, CP2 as shown and described above. By way of example, the eleventh component C11 may be an inverter, the twelfth component C12 may be a powerhead, the thirteenth component C13 may be a converter (e.g., AC-DC or DC-AC), and the fourteenth component C14 may be a power distribution unit. As discussed above, these components may be part of the power local power systems 24 integrated with the marine propulsion devices 20, the central power system 44 positioned in the marine vessel 1, or a combination thereof. Like the second closed loop circuit 160, the third closed loop circuit 170 is configured such that the heat transfer fluid 176 flows therethrough in a fixed direction (here, clockwise).

In certain configurations, the components 80 in the third closed loop circuit 170 are only heat sources, such as components 80 within drive trains of marine propulsion devices 20 (e.g., powerheads, transmissions, etc.). In this case, the valve 180 may be positioned in the open position (as shown in FIG. 3) when the components 80 in the second closed loop circuit 160 require heating, for example a battery operated in cold conditions. It should be recognized that the positions of the valve 152 and the valve 130 as discussed above also vary the temperature of the heat transfer fluid 166 within the second closed loop circuit 160 by changing the heat exchange within the second heat exchanger 150.

The third closed loop circuit 170 extends through a third heat exchanger 190, as does a second open loop circuit 200. In the thermal management system 10 of FIG. 2, the second open loop circuit 200 is configured to convey the water 5 from the body of water 3 in a similar manner to the first open loop circuit 100 discussed above, here via conduits 202. Moreover, rather than having a distinct inlet, outlet, and pump, the second open loop circuit 200 is fluidly connected to the first open loop circuit 100 to receive the water from the same inlet 104 and to return the water to the body of water via the same outlet 106 discussed above. The same pump 108 discussed above is also used to pump the water throughout the second open loop circuit 200. A valve 204 is provided within the second open loop circuit 200 and is positionable to select whether between the water is pumped via the pump 108 to the third heat exchanger 190. In this manner, the valves 110, 204 enables the same pump 108 to be used to selectively supply water to the first open loop circuit 100 and/or the second open loop circuit 200. It should be recognized that this shared use of a pump 108, the inlet 104, and the outlet 106 reduce cost, space, and energy use during operation, while also advantageously reducing the number of through-holes in the marine vessel.

The thermal management system 10 may operate the valves 130, 180 and other valves based on temperature sensors 11 that measure temperatures in the conduits 102, 122, 162, 172, 202, valves 130, 180, within the components 80, and/or elsewhere. These temperatures sensors 11 may be of a type presently known in the art. It should be recognized that the thermal management system 10 may also control the heating or cooling of the second closed loop circuit 160 via control of the valve 180, by changing flow rates via the pumps 164, 174, 124, or other methods discussed herein.

Additional details are now provided regarding the heat transfer fluid 126 flow through the first closed loop circuit 120 with the valve 130 in the first valve position as shown in FIG. 2. Pathways 136 are shown depicting the flow of the heat transfer fluid 126 between the valve ports 134 in this first valve position. The heat transfer fluid 126 flows from the first heat exchanger 128 into the valve 130 at the second valve port VP2. The heat transfer fluid 126 is then divided to exit the valve 130 at the third valve port VP3, the fifth valve port VP5, and the seventh valve port VP7. The heat transfer fluid 126 from the third valve port VP3 flows to both the first and second components C1, C2 (subject to the valves 138, 140 being open). If either of the first and second components C1, C2 does not require cooling, the corresponding valve 138, 140 may be closed to prevent unnecessary cooling, and thus to preserve cooling and efficiency for other components 80 in the thermal management system 10. Any heat transfer fluid 126 provided to the first or second components C1, C2 then returns to the valve 130, now to some extent warmer, via the fourth valve port VP4, which flows via the pathways 136 in the valve 130 to the eighth valve port VP8 discussed further below.

The heat transfer fluid 126 exiting the fifth valve port VP5 flows to the second heat exchanger 150 as needed, which is controlled via the valve 152. This heat transfer fluid 126 from the fifth valve port VP5 has not yet flowed through any components 80 and thus remains fully cooled from the first heat exchanger 128. This preserves the maximum cooling capability for cooling the heat transfer fluid 166 within the second closed loop circuit 160 inside the second heat exchanger 150. This configuration may be particularly advantageous in circumstances in which some of the components 80 within the second closed loop circuit 160 require extensive cooling, such as batteries and electronic devices. This allows the cooling from the first closed loop circuit 120 to be shared with the second closed loop circuit 160 to bolster its ability to cool the components therein. Any heat transfer fluid 126 provided to the second heat exchanger 150 then returns, now somewhat warmer, to the valve 130 via the sixth valve port VP6, which flows via the pathways 136 in the valve 130 to the eighth valve port VP8 discussed further below.

The heat transfer fluid 126 exiting the seventh valve port VP7, as discussed above, has also not yet flowed through any components 80 and thus remains fully cooled from the first heat exchanger 128. This heat transfer fluid 126 can then be used to cool the third component C3 if needed, which is controllable via the valve 154 in a similar manner to the valves 138, 140 discussed above controlling the flow to the first and second components C1, C2. In this manner, the first valve position of FIG. 2 provides maximum cooling for components C1, C2, and C3.

Any heat transfer fluid 126 provided to the third components CP3 next flows, now somewhat warmer, to the fourth component C4 via a conduit 122 outside the valve 130. This configuration may be advantageous in circumstances in which the heat transfer fluid 126 is still sufficiently cool so as to be able to effectively cool the fourth component C4. The configuration may also be advantageous in circumstances in which the fourth component C4 requires heating and the third component C3 has contributed sufficient heat to the heat transfer fluid 126 to do so.

The sixth component C6 receives the heat transfer fluid 126 from the fourth component C4, now further warmed, via a conduit 122 outside the valve 130, and in certain configurations also from the eighth valve port VP8 of the valve 130 (also warmer having gone through components C1, C2, and/or the second heat exchanger 150). In the example shown, the sixth component C6 is a compressor that increases the pressure of the heat transfer fluid 126 to further increase the temperature. In this manner, components requiring heating receive high pressure, compressed refrigerant, whereas components requiring cooling receive low pressure, cold refrigerant. The heat transfer fluid 126 then flows to the fifth component C5, a component requiring heating (e.g., a water heater). Operation of the compressor may be varied depending on the incoming temperature of the heat transfer fluid 126 and the needs of the fifth component C5. A valve 156 also allows at least a portion of the heat transfer fluid 126 to bypass the fifth component C5.

In this manner, all of the heat transfer fluid 126 flows through the compressor (sixth component C6) and, subject to the valve 156, the fifth component C5 to maximum the heating thereof. The heat transfer fluid 126 is then returned to the valve 130 via the ninth valve port VP9, which flows through the pathway 136 in the valve 130 to exit the first valve port VP1 to be returned to the first heat exchanger 128. The first heat exchanger 128 then cools the heat transfer fluid 126 via exchange with cooler water 5 from the first open loop circuit 100 and the cycle through the first closed loop circuit 120 repeats.

Additional details are now provided regarding the heat transfer fluid 166 flow through the second closed loop circuit 160 with the valve 130 in the first valve position as shown in FIG. 2. The heat transfer fluid 166 is pumped via the pump 164 from the second heat exchanger 150 to flow serially though the components 80 in the second closed loop circuit 160. In particular, this heat transfer fluid 166 flows from the second heat exchanger 150 to the seventh component C7, to the eighth component C8, to the ninth component C9, and then to the tenth component C10. If the valve 180 is in the closed position as shown, the heat transfer fluid 166 travels from the tenth component C10 via the pathway 182 of the valve 180 and back to the second heat exchanger 150. The heat transfer fluid 166 then exchanges heat with the heat transfer fluid 126 of the first closed loop circuit 120 within the second heat exchanger 150 and the cycle through the second closed loop circuit 160 repeats.

If instead the valve 180 were positioned in the open position (as shown in FIG. 3), the heat transfer fluid 166 would instead travel from the tenth component C10 through a fourth pathway 181 within the valve 180 to enter the third closed loop circuit 170. It should be recognized that the heat transfer fluids 166, 176 are now intermingled and flow through both the second closed loop circuit 160 and the third closed loop circuit 170, and thus can be referred interchangeably. The heat transfer fluids 166, 176 would then be pumped via the pump 174 to flow serially though the components 80 in the third closed loop circuit 170. In particular, this heat transfer fluid 166, 176 would flow to the eleventh component C11, to the twelfth component C12, to the thirteenth component C13, and then to the fourteenth component C14. The heat transfer fluid 166, 167 would then flow through the valve 180 (here pathway 185) to the third heat exchanger 190 and back to the valve 180, and through the valve 180 (here via pathway 183) back to the second heat exchanger 150 to continue cycling as discussed above.

Returning to FIG. 2, the third heat exchanger 190 exchanges heat between the heat transfer fluid 176 in the third closed loop circuit 170 (which may or may not be intermingled with the heat transfer fluid 166) and the water 5 in the second open loop circuit 200. It should be recognized that in the thermal management system 10 shown, the flow through the second open loop circuit 200 is not affected by the valve positions of the valve 130 or the valve 180. As discussed above, water 5 is drawn in from the body of water 3 via the pump 108, which the valve 204 is open slows to the third heat exchanger 190. The water 5 is then returned to the body of water 3 via the outlet 106.

Therefore, when the valve 130 is in the first valve position as shown in FIG. 2, the thermal management system 10 may use the water 5 from the body of water 3 to either heat or cool the heat transfer fluid 126 in the first closed loop circuit 120, depending on the temperature difference between the body of water 3 and the heat transfer fluid 126. The same is true between the water 5 and the heat transfer fluid 176 inside the third heat exchanger 190 when the valve 180 is closed as shown in FIG. 2, and between the water 5 and both the heat transfer fluid 166 and the heat transfer fluid 176 when the valve 180 is open as shown in FIG. 3.

Additional information is now provided regarding the flow of the heat transfer fluid 126 through the first closed loop circuit 120 when the valve 130 is in a second valve position, as shown in FIG. 3. It should be recognized that the flows of the heat transfer fluid 166 through the second closed loop circuit 160, the heat transfer fluid 176 through the third closed loop circuit 170, and the water 5 through the first open loop circuit 100 and the second open loop circuit 200 are unaffected are independent of the valve position of the valve 130, instead being controlled by the other valves discussed above.

FIG. 3 again shows pathways 136 depicting the flow of the heat transfer fluid 126 between the valve ports 134 in this second valve position. The heat transfer fluid 126 flows from the first heat exchanger 128 into the valve 130 at the second valve port VP2. The heat transfer fluid 126 is then divided to exit the valve 130 at the third valve port VP3 and the seventh valve port VP7. The heat transfer fluid 126 from the third valve port VP3 flows to both the first and second components C1, C2 (subject to the valves 138, 140 being open). If either of the first and second components C1, C2 does not require cooling, the corresponding valve 138, 140 may be closed to prevent unnecessary cooling, and thus to preserve cooling and efficiency for other components 80 in the thermal management system 10. Any heat transfer fluid 126 provided to the first or second components C1, C2 then returns to the valve 130, now to some extent warmer, via the fourth valve port VP4, which flows via the pathways 136 in the valve 130 to the eighth valve port VP8 discussed further below.

The heat transfer fluid 126 exiting the seventh valve port VP7, as with that exiting the third valve port VP3 discussed above, has not yet flowed through any components 80 and thus remains fully cooled from the first heat exchanger 128. This heat transfer fluid 126 can then be used to cool the third component C3 if needed, which is controllable via the valve 154 in a similar manner to the valves 138, 140 discussed above controlling the flow to the first and second components C1, C2. In this manner, the second valve position of FIG. 2 provides maximum cooling for components C1, C2, C3, and others downstream (e.g., C4).

Any heat transfer fluid 126 provided to the third components CP3 next flows, now somewhat warmer, to the fourth component C4 via a conduit 122 outside the valve 130. This configuration may be advantageous in circumstances in which the heat transfer fluid 126 is still sufficiently cool so as to be able to effectively cool the fourth component C4.

The sixth component C6 receives the heat transfer fluid 126 from the fourth component C4, now further warmed, via a conduit 122 outside the valve 130, and also from the eighth valve port VP8 of the valve 130 (also warmer having gone through components C1 and C2). In the example shown, the sixth component C6 is a compressor that increases the pressure of the heat transfer fluid 126 to further increase its temperature. The heat transfer fluid 126 then flows to the fifth component C5, which requires heating (e.g., a water heater). Operation of the compressor may be varied depending on the incoming temperature of the heat transfer fluid 126 and the needs of the fifth component C5. A valve 156 also allows at least a portion of the heat transfer fluid 126 to bypass the fifth component C5.

In this manner, all of the heat transfer fluid 126 flows through the compressor (sixth component C6) and, subject to the valve 156, the fifth component C5 to maximum the heating thereof. The heat transfer fluid 126 is then returned to the valve 130 via the ninth valve port VP9. The heat transfer fluid 126 then flows through the pathways 136 in the valve 130 to the second heat exchanger 150 where it will exchange heat with the heat transfer fluid 166 from the second closed loop circuit 160. It should be recognized that in contrast to the first valve position shown in FIG. 2, whereas the heat transfer fluid 126 was provided to the second heat exchanger 150 without first flowing to any of the components 80, the heat transfer fluid 126 in the second valve position shown in FIG. 3 has flowed to several components 80 before the second heat exchanger 150. Thus, the first valve position of FIG. 2 may provide cooling for the second closed loop circuit 160 via the heat exchanger, which may instead by heated via the second valve position of FIG. 3. The second valve position may be particularly advantageous for warming a battery as a component 80 within the second closed loop circuit 160 early in operation or for operation in cold temperatures. It should be recognized that if the thermal management system 10 determines that the battery no longer needs to be heat, the valve 152 may be closed to prevent further heating via the heat transfer fluid 126. Likewise, the valve 130 may be re-positioned to the first valve position if the battery or another component in the second closed loop circuit 160 subsequently needs cooling.

With continued reference to FIG. 3, any heat transfer fluid 126 flowing to the second heat exchanger 150 then returns to the valve 130 via the fifth valve port VP5, which passes through pathways 136 in the valve 130 and exits the valve 130 via the first valve port VP1 to return to the first heat exchanger 128. The first heat exchanger 128 then cools the heat transfer fluid 126 via exchange with cooler water 5 from the first open loop circuit 100 and the cycle through the first closed loop circuit 120 repeats.

Figure 4:
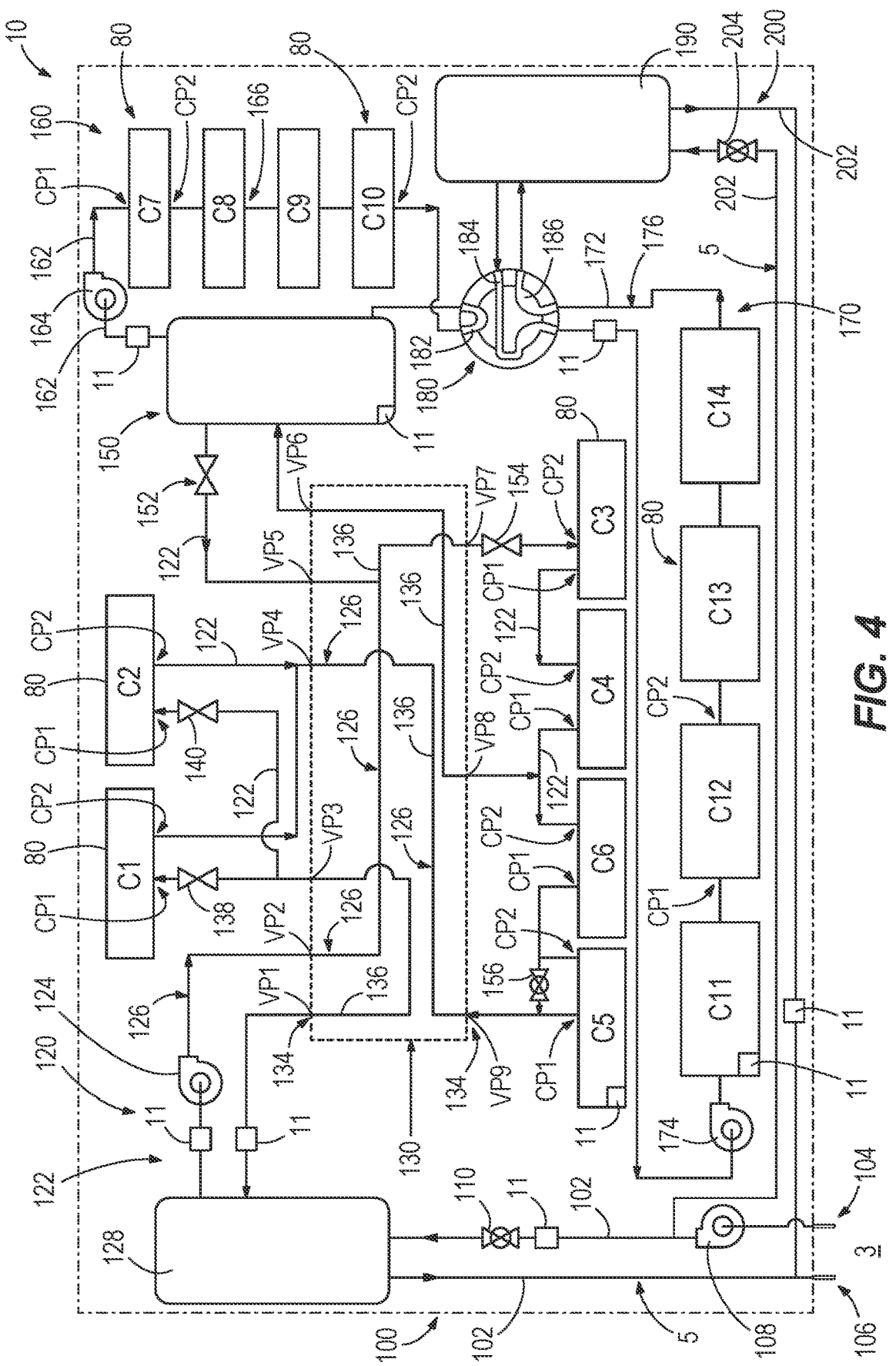
FIG. 4 is schematic view of the thermal management system of FIG. 2 conveying the heat transfer fluid to the components in a third sequence.

Additional information is now provided regarding the flow of the heat transfer fluid 126 through the first closed loop circuit 120 when the valve 130 is in a third valve position, as shown in FIG. 4. It should be recognized that the flows of the heat transfer fluid 166 through the second closed loop circuit 160, the heat transfer fluid 176 through the third closed loop circuit 170, and the water 5 through the first open loop circuit 100 and the second open loop circuit 200 are unaffected are independent of the valve position of the valve 130, instead being controlled by the other valves discussed above.

FIG. 4 again shows pathways 136 depicting the flow of the heat transfer fluid 126 between the valve ports 134 in this third valve position. The heat transfer fluid 126 flows from the first heat exchanger 128 into the valve 130 at the second valve port VP2. The heat transfer fluid 126 is then divided to exit the valve 130 at the fifth valve port VP5 and the seventh valve port VP7. The heat transfer fluid 126 exiting the fifth valve port VP5 flows to the second heat exchanger 150 as needed, which is controlled via the valve 152. This heat transfer fluid 126 from the fifth valve port VP5 has not yet flowed through any components 80 and thus remains fully cooled from the first heat exchanger 128. This preserves the maximum cooling capability for cooling the heat transfer fluid 166 within the second closed loop circuit 160 inside the second heat exchanger 150. This configuration may be particularly advantageous in circumstances in which some of the components 80 within the second closed loop circuit 160 require extensive cooling, such as batteries and electronic devices. This allows the cooling from the first closed loop circuit 120 to be shared with the second closed loop circuit 160 to bolster its ability to cool the components therein. Any heat transfer fluid 126 provided to the second heat exchanger 150 then returns, now somewhat warmer, to the valve 130 via the sixth valve port VP6, which flows via the pathways 136 in the valve 130 to the eighth valve port VP8 discussed further below.

The heat transfer fluid 126 exiting the seventh valve port VP7 has also not yet flowed through any components 80 and thus remains fully cooled from the first heat exchanger 128. This heat transfer fluid 126 can then be used to cool the third component C3 as needed, which is controllable via the valve 154 in a similar manner to the valves 138, 140 discussed above controlling the flow to the first and second components C1, C2. In this manner, the third valve position of FIG. 4 provides maximum cooling for the second heat exchanger 150 and component C3 (and others downstream thereof).

Any heat transfer fluid 126 provided to the third components CP3 next flows, now somewhat warmer, to the fourth component C4 via a conduit 122 outside the valve 130. This configuration may be advantageous in circumstances in which the heat transfer fluid 126 is still sufficiently cool so as to be able to effectively cool the fourth component C4.

The sixth component C6 receives the heat transfer fluid 126 from the fourth component C4, now further warmed, via a conduit 122 outside the valve 130, and also from the eighth valve port VP8 of the valve 130 (also warmer having gone through the second heat exchanger 150). As discussed above, the sixth component C6 is a compressor that increases the pressure of the heat transfer fluid 126 to further increase its temperature. The heat transfer fluid 126 then flows to the fifth component C5, a component requiring heating (e.g., a water heater). Operation of the compressor may be varied depending on the incoming temperature of the heat transfer fluid 126 and the needs of the fifth component C5. A valve 156 also allows at least a portion of the heat transfer fluid 126 to bypass the fifth component C5.

In this manner, all of the heat transfer fluid 126 flows through the compressor (sixth component C6) and, subject to the valve 156, the fifth component C5 to maximum the heating thereof. The heat transfer fluid 126 is then returned to the valve 130 via the ninth valve port VP9, which flows through the pathway 136 in the valve 130 to exit the fourth valve port VP4. The heat transfer fluid 126 then flows to the first and second components C1, C2 in parallel. Since the heat transfer fluid 126 has gone through several components 80 upstream of the first and second components C1, C2, the third valve position provides for selective heating of the first component C1 and/or second component, subject to the valves 138, 140 being open. Any heat transfer fluid 126 provided to the first or second components C1, C2 then returns to the valve 130 via the third valve port VP3, which flows via the pathways 136 in the valve 130 to the first valve port VP1 to be returned to the first heat exchanger 128. The first heat exchanger 128 then cools the heat transfer fluid 126 via exchange with cooler water 5 from the first open loop circuit 100 and the cycle through the first closed loop circuit 120 repeats.

In this manner, the thermal management system 10 shown in FIGS. 2-3 show three valve positions that share heating and cooling. The first valve position may provide cooling for components C1-C4 and heating for component C5 in the first closed loop circuit 120 while also providing cooling for a component 80 in the second closed loop circuit 160. The second valve position may provide cooling for components C1-C4 and heating for component C5 in the first closed loop circuit 120 while also providing heating for a component 80 in the second closed loop circuit 160. The third valve position may provide cooling for components C3-C4 and heating for component C1, C2, and C5 in the first closed loop circuit 120 while also providing cooling for a component 80 in the second closed loop circuit 160. For example, the third valve position may be used to share the heat generated from cooling the batteries of a marine propulsion device to heat the cockpit. It should be recognized that the present disclosure also contemplates alternative connections between the valves and the components, and also further valve positions of these valves, to provide additional configurations for sharing heating and cooling between the components.

It should further be recognized that the thermal management system 10 advantageously provides for customization and scalability for heating and cooling other components. For example, the components 80 shown in FIGS. 2-4 may be substituted for other components requiring heating or cooling. Likewise, additional components may be fluidly connected within the circuits shown, for example in parallel like first and second components C1, C2, or in series like the third and fourth components C3, C4.

Additional information is now provided for subsystems within an exemplary control system 300, which includes one or more central control modules 40, one or more propulsion control modules 42, the helm controller 68, and/or other controllers discussed above and shown in FIG. 1. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 310, which may be implemented as a single microprocessor or other circuitry or be distributed across multiple processing devices or sub-systems that cooperate to execute the executable program 322 from the memory system 320. Non-limiting examples of the processing system include general purpose central processing units, application specific processors, and logic devices.

Each central control module 40 further includes a memory system 320, which may comprise any storage media readable by the processing system 310 and capable of storing the executable program 322 and/or data 324. The memory system 320 may be implemented as a single storage device or be distributed across multiple storage devices or sub-systems that cooperate to store computer readable instructions, data structures, program modules, or other data. The memory system 320 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 330 provides communication between the control system 300 and peripheral devices, such as input devices 299 and output devices 301, which are discussed further below. The IO system 330 communicates via wires and/or wirelessly via input devices 299 and/or output devices 301, or with other elements of the control system 300. In practice, the processing system 310 loads and executes an executable program 322 from the memory system 320, accesses data 324 stored within the memory system 320, and directs the thermal management system 10 to operate as described in further detail below.

A person of ordinary skill in the art will recognize that these subsystems within the control system 300 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. One or more central control module 40 may together constitute a control system 300 and may be located anywhere on the marine vessel 1.

A person of ordinary skill in the art will understand in light of the disclosure that the control system 300 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 300 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 300 is capable of receiving information and/or controlling one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are capable of communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various different types of wireless and/or wired data communication systems.

As will be discussed further below, the control system 300 communicates with input devices 299 from various components such as steering devices, for example via sensors 63, 65 that detect the positions of the throttle lever 66, and the steering device 38, respectively. The control system 300 also communicates with other input devices 299, such as the multi-functional display device 62, the GPS 50, the IMU/AHRS 52, and temperature sensors 11 as discussed above.

The control system 300 also communicates with output devices 301 such as propulsion control modules 42, steering actuators 34 (and steering angle sensors 35 associated therewith), and trim actuators 36 (and trim angle sensors 37 associated therewith), as well as the pumps 56 (e.g., pump 124) and valves 54 (e.g., valve 110) described above. It will be recognized that the arrows shown are merely exemplary and that communication may flow in multiple directions. For example, the multi-functional display device 62 may serve as both an input device 299 for the operator to provide commands, and an output device 301 to display information transmitted from the central control module 40.

In certain configurations, the control system 300 automatically changes the valve positions of the valve 130 and the valve 180 based on the usage of the components 80, and/or based on temperature measurements provided from the temperature sensors 11.

Figure 6:
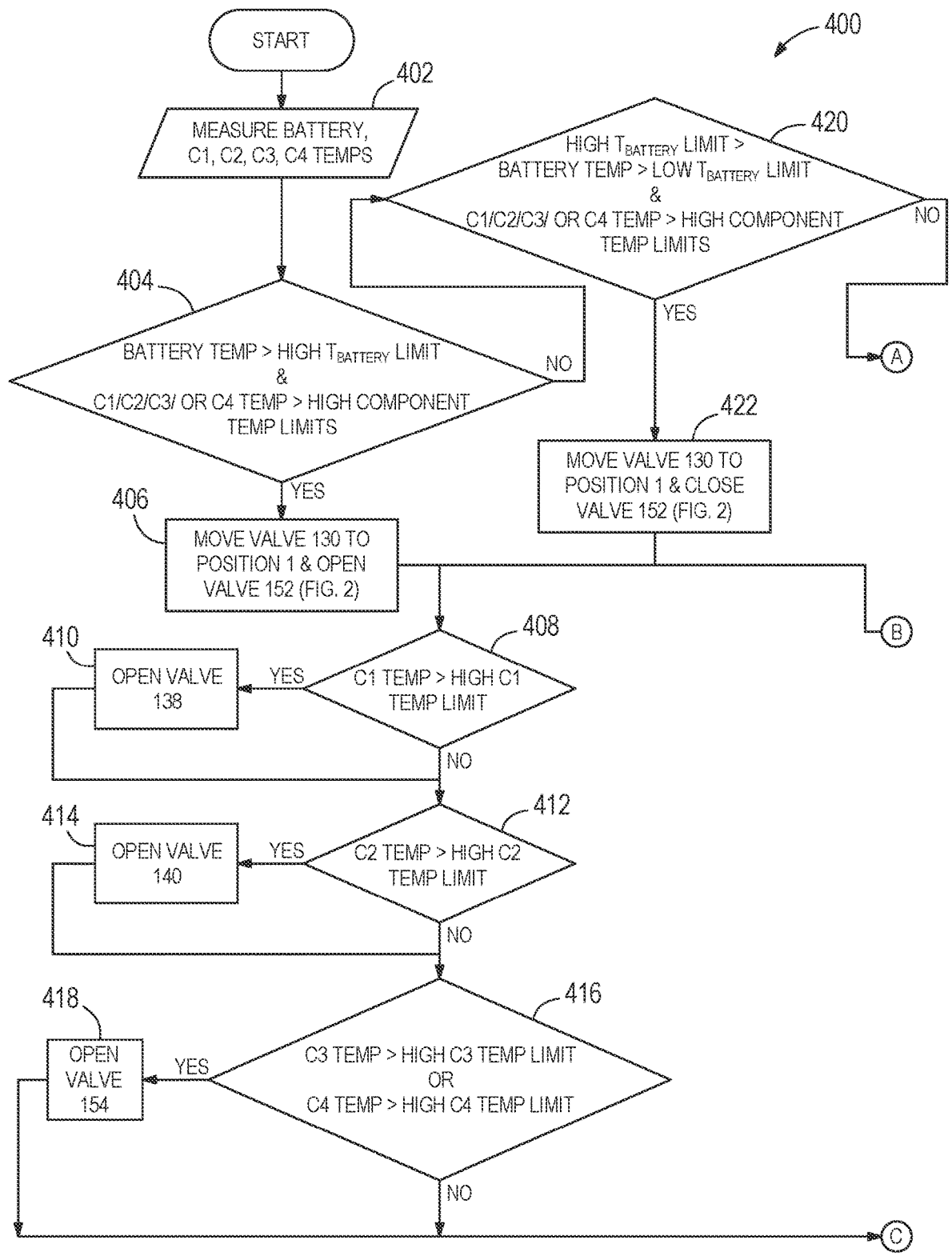
FIG. 6 is a flow chart depicting a method for thermally managing components according to the present disclosure.
Figure 6:
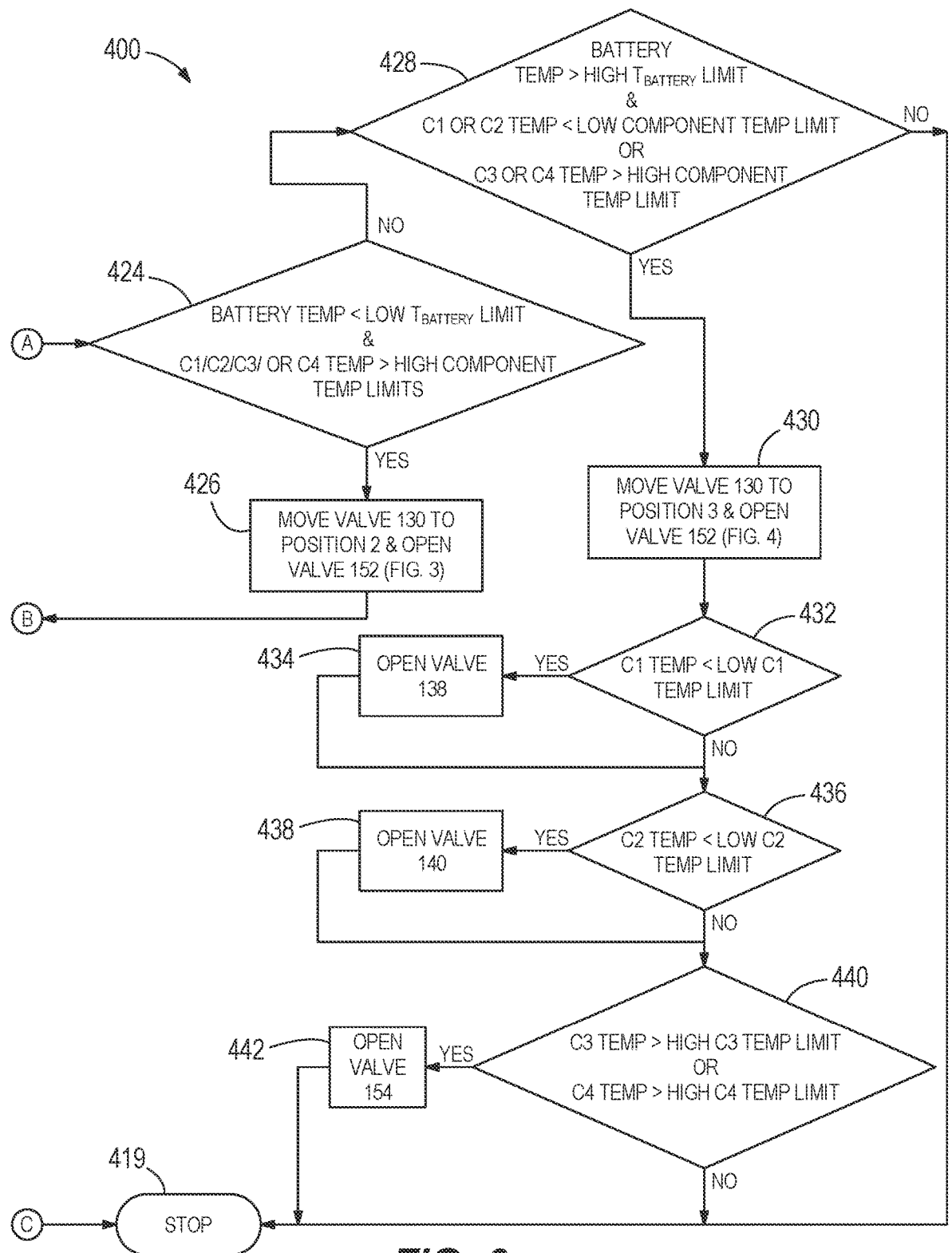

FIG. 6 depicts an example of a method 400 for cooling components of a marine vessel according to the present disclosure, which references to elements shown in FIGS. 2-4. The method is described as a series of logic steps, the effects of which were already discussed above with respect to FIGS. 2-4.

Figure 5:
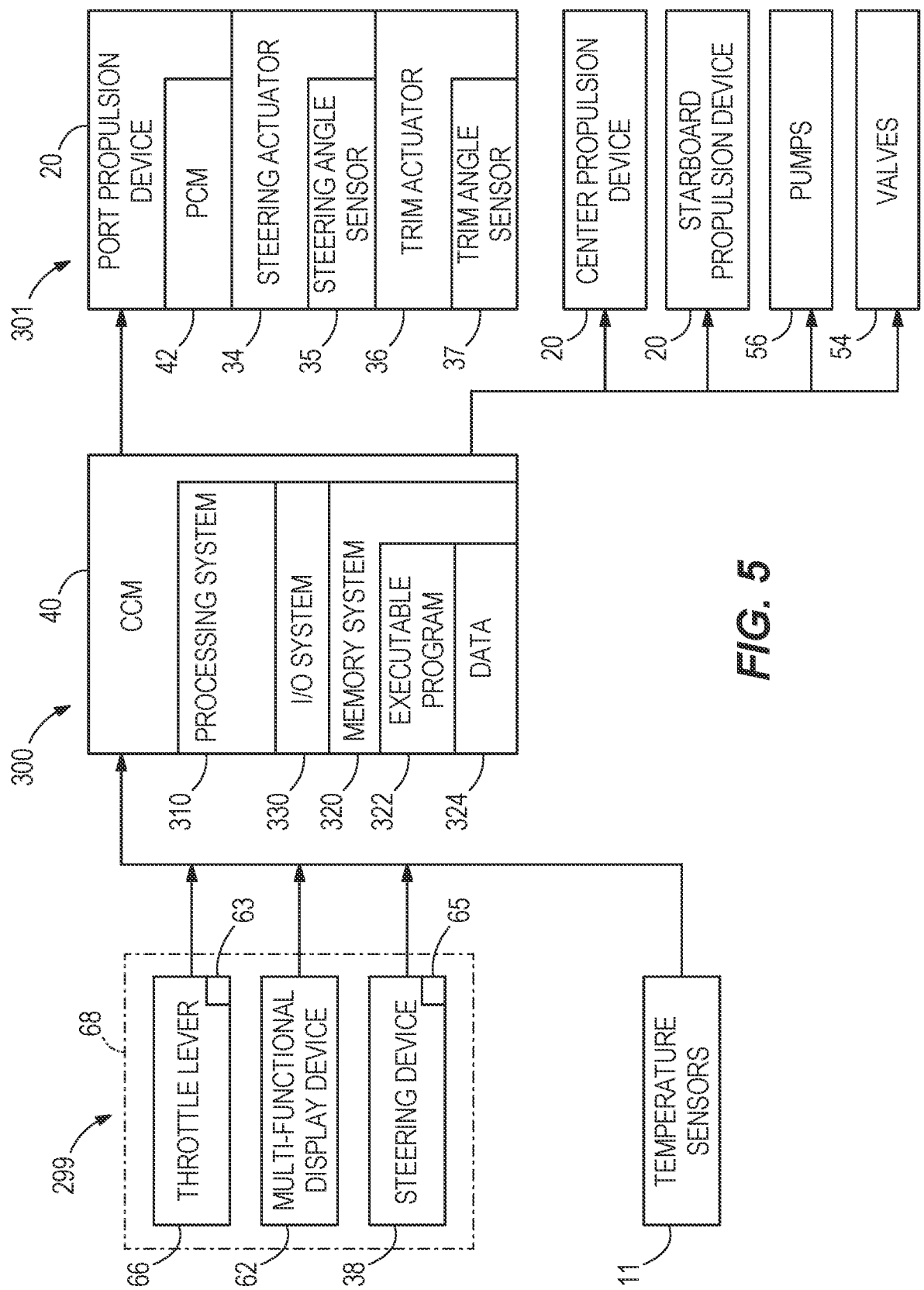
FIG. 5 is a schematic view of a control system for controlling a thermal management system according to the present disclosure.

Step 402 provides for measuring temperatures of the components, in this case a battery (e.g., component C8) and components C1-C4 (e.g., an HVAC system for a cockpit, an HVAC system for a cabin, a refrigerator, and a freezer as shown in FIG. 1). These temperatures may be measured using one of the techniques discussed above, or others known in the art. The temperatures are then compared to thresholds for each component, which may be stored within the data 324 of the memory system 320 (FIG. 5). In step 404 it is determined whether the temperature of the battery (component C8) exceeds a high temperature threshold corresponding thereto, also referred to as the high temperature (battery) limit, and whether one or more of components C1-C4 exceed high temperature thresholds corresponding thereto, also referred to as high temperature (component) limits. By way of example, the high temperature threshold for the battery may be 30-40 degrees Celsius. The high temperature thresholds for the components may be the same as those for the battery, or other ranges.

If it is determined in step 404 that the temperature of the battery exceeds its high temperature threshold and the temperature of at least one of the components C1-C4 exceeds the corresponding high temperature threshold, the method proceeds to step 406. In step 406, valve 130 is moved to a first position as shown in FIG. 2 and the valve 152 is also opened. The effect of moving the valves in this manner was discussed above with regard to FIG. 2. Step 408 provides for determining whether the temperature of the first component C1 exceeds the high temperature threshold corresponding thereto. If step 408 is determined to be affirmative, step 410 proceeds with opening valve 138. After step 410, or if step 408 is determined to be negative, the method proceeds to step 412 with a determination of whether the temperature of component 2 C2 exceeds the high temperature threshold corresponding thereto. If step 412 is determined to be affirmative, step 414 provides for opening valve 140.

After step 414, or if step 412 is determined to be negative, the method proceeds to step 416 with a determination of whether either the temperature of component 3 C3 exceeds the high temperature threshold corresponding thereto, or the temperature of component 4 C4 exceeds the high temperature threshold corresponding thereto. If step 416 is determined to be affirmative (i.e., either high temperature threshold is exceeded), step 418 proceeds with opening valve 154. After step 418, or if step 416 is determined to be negative, the method 400 is completed (step 419). It should be recognized that the method 400 may be performed on a repeating or periodic basis, such as to continue monitoring the temperatures of the components and control the system accordingly.

If alternatively step 404 is determined to be negative, the method continues to step 420. Step 420 provides for determining whether the temperature of the battery (e.g., component C8) is both less than its high temperature threshold and greater than a low temperature threshold (e.g., 0-10 degrees Celsius) also stored among the thresholds in memory. In other words, step 420 determines whether the temperature of the battery is between the upper and lower temperature thresholds. Step 420 also determines whether the temperature of at least one of the components C1-C4 exceeds the corresponding high temperature threshold, similar to this portion of step 404 discussed above. If step 420 is determined to be affirmative (i.e., the battery temperature is between its upper and lower temperature thresholds, and at least one of the components C1-C4 exceeds its corresponding high temperature threshold), the method proceeds to step 422. Step 422 provides for moving the valve 130 to the first position (shown in FIG. 2), but in contrast to step 406, closing the valve 152. After step 422 the method proceeds to step 406 and continues as discussed above.

If alternatively step 420 is determined to be negative, the method continues to step 424. Step 424 provides for determining whether the temperature of the battery (e.g., component C8) is less than its low temperature threshold, and also whether the temperature of at least one of the components C1-C4 exceeds the corresponding high temperature threshold, similar to this portion of step 404 discussed above. If step 424 is determined to be affirmative, the method proceeds to step 426. Step 426 provides for moving the valve 130 to a second position (shown in FIG. 3) and opening the valve 152. After step 426 the method proceeds to step 406 and continues as discussed above.

If alternatively step 424 is determined to be negative, the method continues to step 428. Step 428 provides for determining whether the temperature of the battery (e.g., component C8) exceeds its high temperature threshold. Step 428 also determines whether the temperature of at least one of the first component C1 and the second component C2 is less than the low temperature threshold corresponding thereto. Step 428 further determines whether the temperature of at least one of the third component C3 and the fourth component C4 exceeds the high temperature threshold corresponding thereto. If step 428 is determined to be affirmative, the method proceeds to step 430. Step 430 provides for moving the valve 130 to a third position (shown in FIG. 4) and opening the valve 152. After step 430, the method proceeds to step 432.

Step 432 provides for determining whether the temperature of the first component C1 is less than the low temperature threshold corresponding thereto. If step 432 is determined to be affirmative, step 434 proceeds with opening valve 138. After step 434, or if step 432 is determined to be negative, the method proceeds to step 436 with a determination of whether the temperature of component 2 C2 is less than the low temperature threshold corresponding thereto. If step 436 is determined to be affirmative, step 438 provides for opening valve 140. After step 438, or if step 436 is determined to be negative, the method proceeds to step 440 with a determination of whether either the temperature of component 3 C3 is less than the low temperature threshold corresponding thereto, or the temperature of component 4 C4 is less than the low temperature threshold corresponding thereto. If step 440 is determined to be affirmative (i.e., either temperature is below the low temperature threshold), step 442 proceeds with opening valve 154. After step 442, or if step 440 is determined to be negative, the method 400 is completed (step 419).

It should be recognized that other methods are also contemplated by the present disclosure, and that these methods may be used for thermally managing components other than those expressly discussed and shown.

It should further be recognized that while the present disclosure generally provided examples of thermal management system 10 used in conjunction with marine vessels, other uses and context are also contemplated, including recreational vehicles (RVs) and other vehicles having components requiring cooling and/or heating. The present inventors have recognized unmet needs for thermally managing these components. Any house loads that consume power for cooling or heating result in inefficiency and, particularly for vehicles that also use electric power for propulsion, reduced operating range. Therefore, to extend the operating range of these vehicles, it is important to improve efficiency of heat transfer and reuse heat where possible. Heat pumps are commonly employed to provide cooling and heating. Refrigeration systems are often required to provide battery cooling. The present inventors have recognized that the heating and cooling needs of power systems (e.g., batteries), propulsion devices, and house loads (e.g., HVAC) can be combined together for a more efficient thermal management system for vehicles.

As discussed above, the thermal management systems 10 disclosed herein provide many advantages over systems presently known in the art. Sharing the heating and cooling across the components in the manner presently disclosed allows heating and cooling to be accomplished using fewer valves and heat exchangers than systems presently known in the art. This provides reduced installation cost, space, operating cost, and maintenance. Likewise, by providing warmed heat transfer fluid to any compressors (e.g., Component C6), less work is required by the compressor, saving energy and extending the life of the component. Additionally, within the unique context of marine vessels, the present inventors have recognized that the body of water in which the marine vessel is operated can be used both for rejecting heat from the thermal management system and to extract heat for the thermal management system (e.g., selectable by reversing a direction of flow via the valve). For example, the body of water may be used as a heat source for cabin heating. In short, the presently disclosed thermal management system 10 improves energy efficiency of heating and cooling for both propulsion and non-propulsion components while also reducing the number of devices to do so.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A thermal management system for a marine vessel, the thermal management system comprising:
    an open loop circuit;
    a pump that pumps water from the body of water in which the marine vessel is operating, through the open loop circuit, and back to the body of water;
    a closed loop circuit;
    a pump that pumps a heat transfer fluid through the closed loop circuit;
    a heat exchanger configured to exchange heat between the water and the heat transfer fluid;
    a plurality of components each cooled or heated by the heat transfer fluid; and
    a valve having valve positions configured to vary a sequence that the heat transfer fluid is conveyed to the plurality of components so as to vary how the plurality of components share the heating and cooling from the heat transfer fluid and from the water from the body of water via the heat transfer fluid, wherein in each of the valve positions the heat transfer fluid from the heat exchanger enter the valve via a same valve inlet and returns from the valve to the heat exchanger via a same valve outlet.

2. The thermal management system according to claim 1, further comprising a compressor cooled or heated by the heat transfer fluid, wherein in a first position of the valve positions all of the heat transfer fluid conveyed to the compressor is first conveyed to a first component of the plurality of components.

3. The thermal management system according to claim 2, wherein in a second position of the valve positions a portion of the heat transfer fluid conveyed to the compressor bypasses the first component.

4. The thermal management system according to claim 1, wherein changing the valve position varies whether the water from the body of water heats or cools the fluid transfer fluid in the closed loop circuit.

5. The thermal management system according to claim 1, wherein the heat transfer fluid is conveyed to two components of the plurality of components in parallel such that neither is upstream of the other.

6. The thermal management system according to claim 5, wherein neither of the two components is upstream of the other in any of the valve positions.

7. The thermal management system according to claim 1, wherein the heat exchanger is a first heat exchanger, the heat transfer fluid is a first heat transfer fluid, the closed loop circuit is a first closed loop circuit, and the plurality of components is a first plurality of components, further comprising a second closed loop circuit and a pump that pumps a second heat transfer fluid through the second closed loop circuit, further comprising a second heat exchanger configured to exchange heat between the first heat transfer fluid and the second heat transfer fluid, and further comprising a second plurality of components each cooled or heated by the second heat transfer fluid.

8. The thermal management system according to claim 7, wherein the valve is configured such that the valve positions vary a sequence that the first heat transfer fluid is conveyed to the second heat exchanger relative to at least one component of the first plurality of components.

9. The thermal management system according to claim 7, wherein in a first position of the valve positions the first heat transfer fluid is conveyed from the first heat exchanger to the second heat exchanger without first being conveyed to any components of the first plurality of components, and wherein in a second position of the valve positions the first heat transfer fluid is conveyed from the first heat exchanger, to at least one component of the first plurality of components, and then to the second heat exchanger.

10. The thermal management system according to claim 7, wherein the second heat transfer fluid is conveyed within the second closed loop circuit in a fixed direction.

11. The thermal management system according to claim 10, wherein the second plurality of components include a battery charger and a battery that is upstream of the battery charger.

12. The thermal management system according to claim 11, wherein in a first position of the valve positions all of the first heat transfer fluid conveyed to the second heat exchanger is conveyed to the second heat exchanger without first cooling any component of the first plurality of components to thereby maximize cooling of the second heat transfer fluid.

13. The thermal management system according to claim 12, wherein in a second position of the valve positions the first heat transfer fluid cools at least one component in the first plurality of components before being conveyed to the second heat exchanger.

14. The thermal management system according to claim 13, wherein the valve is positioned in the first position when the battery requires cooling and positioned in the second position when the battery requires heating.

15. A thermal management system for a marine vessel, the thermal management system comprising:
- a first open loop circuit through which water from a body of water in which the marine vessel is operating is conveyed;
- a first closed loop circuit through which a first heat transfer fluid is conveyed;
- a first heat exchanger configured to exchange heat between the water and the first heat transfer fluid;
- a first plurality of components each cooled or heated by the first heat transfer fluid;
- a first valve having valve positions configured to vary a sequence that the first heat transfer fluid is conveyed to the first plurality of components so as to vary how the first plurality of components share the heating and cooling from the first heat transfer fluid and from the water from the body of water via the first heat transfer fluid, wherein in each of the valve positions of the first valve the first heat transfer fluid from the first heat exchanger enter the first valve via a same valve inlet and returns from the first valve to the first heat exchanger via a same valve outlet;
- a second closed loop circuit through which a second heat transfer fluid is conveyed;
- a second heat exchanger configured to exchange heat between the first heat transfer fluid and the second heat transfer fluid;
- a second plurality of components each cooled or heated by the second heat transfer fluid;
- a third closed loop circuit through which a third heat transfer fluid is conveyed;
- a third plurality of components each cooled by the third heat transfer fluid; and
- a second valve having a first valve position and a second valve position, wherein in the first position the second valve fluidly separates the second closed loop circuit and the third closed loops from each other, and wherein in the second position the second valve fluidly couples the second closed loop circuit and the third closed loop circuit in series such that the second heat transfer fluid and the third heat transfer fluid are each conveyed to both the second plurality of components and the third plurality of components.

16. A thermal management system for a marine vessel, the thermal management system comprising:
- a first open loop circuit through which water from a body of water in which the marine vessel is operating is conveyed;
- a first closed loop circuit through which a first heat transfer fluid is conveyed;
- a first heat exchanger configured to exchange heat between the water and the first heat transfer fluid;
- a first plurality of components each cooled or heated by the first heat transfer fluid;
- a first valve having valve positions configured to vary a sequence that the first heat transfer fluid is conveyed to the first plurality of components so as to vary how the first plurality of components share the heating and cooling from the first heat transfer fluid and from the water from the body of water via the first heat transfer fluid;
- a second closed loop circuit through which a second heat transfer fluid is conveyed;
- a second heat exchanger configured to exchange heat between the first heat transfer fluid and the second heat transfer fluid;
- a second plurality of components each cooled or heated by the second heat transfer fluid;
- a third closed loop circuit through which a third heat transfer fluid is conveyed;
- a third plurality of components each cooled by the third heat transfer fluid;

a second valve having a first valve position and a second valve position, wherein in the first position the second valve fluidly separates the second closed loop circuit and the third closed loop circuit from each other, and wherein in the second positon the second valve fluidly couples the second closed loop circuit and the third closed loop circuit in series such that the second heat transfer fluid and the third heat transfer fluid are each conveyed to both the second plurality of components and the third plurality of components;
- a second open loop circuit through which water from the body of water is conveyed; and
- a third heat exchanger configured to exchange heat between the water in the second open loop circuit and the third heat transfer fluid.

17. The thermal management system according to claim 16, wherein the third heat exchanger is configured to exchange heat between the water in the second open loop circuit and the third heat transfer fluid in both the first position and the second position of the second valve.

18. The thermal management system according to claim 17, wherein the third plurality of components includes a drive train component that generates power to propel the marine vessel.

19. The thermal management system according to claim 15, wherein the second heat transfer fluid and the third heat transfer fluid are chemically the same as each other and different from the first heat transfer fluid.

* * * * *

UNITED STATES PATENT AND TRADEMARK OFFICE
CERTIFICATE OF CORRECTION

Page 1 of 1

PATENT NO. : 12,441,449 B1
APPLICATION NO. : 17/900470
DATED : October 14, 2025
INVENTOR(S) : Chetan Dharmadhikari et al.

It is certified that error appears in the above-identified patent and that said Letters Patent is hereby corrected as shown below:

In the Claims

Column 22, Line 36 of Claim 16:
"second positon…"
Should instead read:
--second position…--

Signed and Sealed this
Ninth Day of December, 2025

John A. Squires
*Director of the United States Patent and Trademark Office*